(12) United States Patent
Ishii et al.

(10) Patent No.: US 6,285,832 B1
(45) Date of Patent: Sep. 4, 2001

(54) SEMICONDUCTOR PHOTO DETECTOR ELEMENT, DISTANCE MEASURING EQUIPMENT, AND CAMERA

(75) Inventors: Shuichi Ishii; Takaaki Kotani; Seimei Ushiro, all of Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/559,541

(22) Filed: Apr. 28, 2000

(30) Foreign Application Priority Data

| Apr. 28, 1999 | (JP) | 11-121781 |
| Apr. 28, 1999 | (JP) | 11-121786 |
| Apr. 28, 1999 | (JP) | 11-121791 |
| Apr. 5, 2000 | (JP) | 12-102908 |

(51) Int. Cl.[7] ............... G02B 7/28; G02B 7/30; G03B 7/099; G03B 13/00
(52) U.S. Cl. .......... 396/120; 396/106; 396/123
(58) Field of Search ............. 396/56, 57, 61, 396/62, 89, 92, 93, 94, 95, 100, 105, 106, 107, 109, 115, 120, 121, 123

(56) References Cited

U.S. PATENT DOCUMENTS

| 4,682,872 | * | 7/1987 | Suzuki | 396/120 |
| 5,087,119 | * | 2/1992 | Kaneko | 396/106 |
| 5,184,168 | * | 2/1993 | Nomaka | 396/123 |

FOREIGN PATENT DOCUMENTS

| 5-18745 | 1/1993 | (JP) | G01C/3/06 |

* cited by examiner

*Primary Examiner*—Russell Adams
*Assistant Examiner*—Rochelle Blackman
(74) *Attorney, Agent, or Firm*—Sughrue, Mion, Zinn, Macpeak & Seas, PLLC

(57) ABSTRACT

A camera is provided with an SPD and a PSD suitable for implementing a camera capable of enhancing an accuracy of focusing and/or reducing a cost with a small scale of circuit. In the event that a photography is performed at a relatively short distance, a switch is switched by an MPU to offer a low impedance state. An AF-dedicated photo detector circuit determines a distance $I_1$ and $I_2$ obtained through a pair of signal electrodes of the PSD. On the other hand, in case of a relatively long distance, the MPU switches the switch to offer a high impedance state in accordance with distance data representative of the determined distance, so that an AF-dedicated photo detector circuit determines a distance up to the camera subject in accordance with photo-current $I_3$ obtained from one of the signal electrodes of the PSD. In this manner, in the event that a photography is performed at a relatively long distance, there is performed a processing of determining a distance up to the subject in accordance with a total quantity of light.

19 Claims, 6 Drawing Sheets

SEMICONDUCTOR PHOTO DETECTOR ELEMENT, DISTANCE MEASURING EQUIPMENT, AND CAMERA

BACKGROUND OF THE INVENTION

1. Field of the Invention

The present invention relates to a semiconductor photo detector element such as a silicon photo diode (SPD) and a position sensitive device (PSD), distance measuring equipment for measuring a distance up to a target to be measured in distance using the semiconductor photo detector element, and a camera using the semiconductor photo detector element.

2. Description of the Related Art

There is widely spread a camera incorporating thereinto an automatic focusing (AF) device, which is generally referred to as an active type. Such an active type of automatic focusing device adopts a system for measuring a distance up to a camera subject in such a manner that an AF light projection unit and an AF photo detection unit are disposed at intervals of a predetermined base length, light is projected from the AF light projection unit to the camera subject, and light reflected on the camera subject is detected by the AF photo detection unit. As a photo detector element for focusing, for example, a semiconductor element, such as an SPD element and a PSD element, is used. By way of example, Japanese Patent Application Laid Open Gazette Sho. 57-22508 discloses a system in which a PSD element is used to perform focusing. In some cases, a camera is provided with an automatic flash emission device (an automatic electronic flash device), in which at the time of a photography, a flash is projected to a camera subject, a reflected light from the camera subject is detected, and a flash emission is stopped at a timing that the reflected light reaches a predetermined light quantity, and a remote control device for instructing an execution of an operation (for example, a self-time operation) according to a received light from a remote control equipment (for example, for a self-timer) for controlling the camera in accordance with an emission of light is directed to the camera, as well as an automatic focusing device. In such a case, in the camera, the automatic electronic flash device and the remote control device are provided with semiconductor photo detector elements represented by the SPD element, in addition to the semiconductor photo detector elements represented by the SPD element, in addition to the semiconductor photo detector element for the automatic focus (AF).

FIG. 9 is a diagram of semiconductor photo detector elements incorporated into the respective devices and their associated circuits, with respect to the conventional camera.

In FIG. 9, there is shown a PSD 61, which is one example of the semiconductor photo detector element for the automatic focus (AF), and an AF-dedicated photo detector circuit 62, which are provided in an automatic focusing device; and an SPD 63 provided in another device and a dedicated photo detector 64 for the another device. The AF-dedicated photo detector 62 and the dedicated photo detector circuit 64 are connected to an MPU (Micro Processor Unit) 65 serving as a control unit. Here, there will be explained a case wherein the camera is provided with an automatic electronic flash device as the "another device".

The PSD 61 shown in FIG. 9 generates a photo-current in such a manner that light for focusing is projected from an AF light projection unit (not illustrated) to a camera subject to the light for focusing reflected on the camera subject is detected on a detection surface of the PSD 61. The photo-current thus generated is separated into photo-currents $I_1$ and $I_2$ in accordance with distances between an irradiation position on the detection surface and both ends of the detection surface, respectively, and the photo-currents $I_1$ and $I_2$ are fed to the AF-dedicated photo detector circuit 62. The AF-dedicated photo detector circuit 62 determines a distance up to the camera subject in accordance with both photo-current $I_1$ and $I_2$. The MPU controls a driving lens for focusing in accordance with the distance thus determined.

On the other hand, the SPD 63 detects the reflected light from the camera subject through the flash projected to the camera subject from an automatic electronic flash device at the time of photography. A photo-current $I_3$ generated through the detection by the SPD 63 conducts via the dedicated photo detector circuit 64. The dedicated photo detector circuit 64 integrates the photo-current $I_3$ and outputs a signal to stop the flashing operation of the automatic electronic flash device in the timing that the integrated photo-current $I_3$ reaches a predetermined quantity of reflected light. This signal is transmitted to the MPU 65 as well as a flash emission stop control unit (not illustrated). The MPU 65 performs a control of shutter closing and the like in accordance with this signal.

As mentioned above, in some case, the conventional camera is provided with an automatic electronic flash device and a remote control device as well as an automatic focusing device. In such a camera, although the photo detection wavelengths of those devices are mutually closed, those devices are individually provided with their dedicated photo detector elements. Thus, the conventional camera is associated with a problem that the number of photo detector elements is increased, and as a result a circuit scale is enlarged. Accordingly, there is also a problem that the cost is increased.

Further, there is proposed a technology (cf. Japanese Patent Application Laid Open Gazette Hei. 7-260475) in which instead of the AF-dedicated photo detector circuit 62, the signal of the photo-current is subjected to an A/D conversion and then is operated. However, also in accordance with this technology, the number of photo detector elements is large. This technology is also associated with a problem that the cost is increased.

In order to solve those problems, it is considered that one semiconductor photo detector element is used on a common basis for the automatic focusing device and another device. However, control and processing method for photo detection signals in the automatic focusing device are different from those in another device, for example, an automatic electronic flash device. Therefore, it is difficult for another device to use an AF-dedicated photo detector circuit for processing photo-current from the semiconductor photo detector element as a photo detector circuit as it is.

Further, the camera incorporated therein an automatic focusing device is also associated with an additional problem that as to focusing for distance, an accuracy of focusing is lowered.

SUMMARY OF THE INVENTION

In view of the foregoing, it is an object of the present invention to provide a semiconductor photo detector element suitable for implementing a camera capable of enhancing an accuracy of focusing and/or reducing a cost with a small scale of circuit, a distance measuring equipment adopting such a semiconductor photo detector element, and a camera using the semiconductor photo detector element.

To achieve the above-mentioned object, the present invention provides a semiconductor photo detector element comprising:

a detection surface for generating a photo-current upon receipt of irradiation of light;

a pair of signal electrodes, disposed at both ends of said detection surface, adapted for outputting on a share basis the photo-current generated by irradiation of light onto said detection surface; and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal.

According to the semiconductor photo detector element of the present invention as mentioned above, there is provided the first switch disposed at a position adjacent to one signal electrode which is one of said pair of signal electrodes. This feature makes it possible to derive the photo-current from both the signal electrodes of the pair of signal electrodes through changing over the first switch to the first state, or alternatively to derive the photo-current from only one signal electrode of the pair of signal electrodes through changing over the first switch to the second state. Thus, according to the semiconductor photo detector element of the present invention, as will be described later, it is possible to perform focusing according to, for example, a plurality of algorithms mutually different in a focusing principle, and also possible to use the semiconductor photo detector element on a common basis for a sensor for automatic focusing and a sensor for another device.

In the semiconductor photo detector element of the present invention as mentioned above, it is acceptable that when said first switch is in the first state, said pair of signal electrodes output on a share basis the photo-current generated by irradiation of light onto said detection surface in accordance with respective distances between an irradiation position of the light on said detection surface and both the ends of the detection surface.

Further, in the semiconductor photo detector element of the present invention as mentioned above, it is acceptable that said semiconductor photo detector element further comprises a second switch, disposed at a boundary located between two divided areas of said detection surface, each of said two areas including associated one edge of said detection surface, for selectivity offering a first state which permits the photo-current generated on said detection surface to conduct through the boundary, and a second state which inhibits the photo-current generated on said detection surface from conducting through the boundary, in accordance with a control signal.

In the semiconductor photo detector element of the present invention as mentioned above, distance measuring equipment of the present invention and a camera of the present invention, which will be described later, said first state is a low impedance state, and said second state is a high impedance state. However, the first state and the second state are not always restricted to the low impedance state and the high impedance state, but the first state is a state that permits the photo-current generated on the detection surface to conduct through a switch, and the second state is a state that inhibits the photo-current generated on the detection surface from conducting through the switch.

To achieve the above-mentioned object, the present invention provides a distance measuring equipment comprising:

a light projecting unit for projecting light for a distance measurement; and a photo detector unit, having a light detection window disposed at an interval of a predetermined distance from said light projecting unit, for determining a distance up to a subject in such a manner that light is projected from said light projecting unit, and light reflected on the subject is detected through said light detection window, wherein said photo detector unit comprises:

a semiconductor photo detector element comprising a detection surface for generating a photo-current upon receipt of irradiation of light, a pair of signal electrodes, disposed at both ends of said detection surface, adapted for outputting on a share basis the photo-current generated by irradiation of light onto said detection surface, and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal;

a first distance arithmetic unit for determining a distance up to the subject in accordance with both the photo-currents derived through said pair of signal electrodes, in a state that said first switch is changed over to said first state; and a second distance arithmetic unit for determining a distance up to the subject in accordance with the photo-current derived through another signal electrode different from said one signal electrode, of said pair of signal electrodes, in a state that said first switch is changed over to said second state.

According to the distance measuring equipment of the present invention as mentioned above, there are provided the first and second distance arithmetic units for determining a distance up to the subject in accordance with the mutually different focusing algorithms. Thus, it is possible to extend a possible focusing range of distance and also possible to perform a distance measurement with greater accuracy.

In the semiconductor photo detector element, which is used in the distance measuring equipment of the present invention as mentioned above, it is acceptable that when said first switch is in the first state, said pair of signal electrodes output on a share basis the photo-current generated by irradiation of light onto said detection surface in accordance with respective distances between an irradiation position of the light on said detection surface and both the ends of the detection surface.

In the distance measuring equipment of the present invention as mentioned above, it is acceptable that said semiconductor photo detector element further comprises a second switch, disposed at a boundary located between two divided areas of said detection surface, each of said two areas including associated one edge of said detection surface, for selectively offering s first state which permits the photo-current generated on said detection surface to conduct the boundary, and a second state which inhibits the photo-current generated on said detection surface from conducting through the boundary, in accordance with a control signal.

To achieve the above-mentioned object, the present invention provides a camera loaded with a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said photo detector unit comprises:

a semiconductor photo detector element comprising a detection surface for generating a photo-current upon receipt of irradiation of light, a pair of signal electrodes, disposed at both ends of said detection surface, adapted for outputting on a share basis the photo-current generated by irradiation of light onto said detection surface, and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal;

a control unit for generating a control signal to change over said first switch and transmitting the control signal to said semiconductor photo detector element;

a first distance arithmetic unit for determining a distance up to the subject in accordance with both the photo-currents derived through said pair of signal electrodes, in a state that a control signal to change over said first switch to said first state is transmitted to said semiconductor photo detector element by said control unit; and a second distance arithmetic unit for determining a distance up to the subject in accordance with the photo-current derived through another signal electrode different from said one signal electrode, of said pair of signal electrodes, in a state that a control signal to change over said first switch to said second state is transmitted to said semiconductor photo detector element by said control unit.

According to the camera of the present invention as mentioned above, there are provided the first and second distance arithmetic units for determining a distance up to the subject in accordance with the mutually different focusing algorithms. Thus, it is possible to extend a possible focusing range of distance and also possible to perform a distance measurement with greater accuracy.

For example, according to an embodiment of the present invention which will be described later, in the event that a photography is performed at the relatively short distance, the first switch of the semiconductor photo detector element is switched by the control unit to offer the low impedance state which is an example of the first state mentioned above. Thus, the first distance arithmetic unit determines a distance up to a subject in accordance with both the photo-currents obtained through the pair of signal electrodes of the semiconductor photo detector element. On the other hand, in the event that a photography is performed at the relatively long distance, the first switch of the semiconductor photo detector element is switched by the control unit to offer the high impedance state which is an example of the second state mentioned above. Thus the second distance arithmetic unit determines a distance up to a subject in accordance with photo-current obtained from one of the pair of signal electrodes of the semiconductor photo detector element. In this manner, in the event that a photography is performed at the relatively long distance, there is performed a processing of determining a distance up to the subject in accordance with a total quantity of light. Thus, it is possible to enhance accuracy of focusing in focusing of the long distance.

To achieve the above-mentioned object, the present invention provide a second camera loaded with a flash emission device in which at the time of a photography a flash is projected to a subject, a reflected light from the subject is detected, and a flash emission is stopped at a timing that the reflected light reaches a predetermined light quantity, and a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said camera comprises:

a semiconductor photo detector element comprising a detection surface for generating a photo-current upon receipt of irradiation of light, a pair of signal electrodes, disposed at both ends of said detection surface, adapted for outputting on a share basis the photo-current generated by irradiation of light onto said detection surface, and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal, said semiconductor photo detector element being used on a common basis for said flash emission device and said distance measuring equipment and serving to detect both flash reflected on the subject and incident through said light detection window and light for focusing reflected on the subject and incident through said light detection window; and a control unit for generating a control signal to change over said first switch and transmitting the control signal to said semiconductor photo detector element.

According to the second camera of the present invention as mentioned above, there is adopted the semiconductor photo detector element having the above-mentioned first switch. That is, the semiconductor photo detector element is used on a common basis for the flash emission device and the distance measuring equipment. This feature makes it possible for the semiconductor photo detector element to serve to detect both flash reflected on the subject and light for focusing reflected on the subject. Thus, according to the second camera of the present invention, as compared with the conventional camera in which photo detector elements are provided individually for the flash emission device and the distance measuring equipment, it is possible to reduce the number of photo detector elements.

To achieve the above-mentioned object, the present invention provides a third camera loaded with a remote control device responsive to light from a remote control equipment for controlling the camera in accordance with an emission of light directed to the camera for instructing an execution of operation according to detection of the light, and a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said camera comprises:

a semiconductor photo detector element comprising a detection surface for generating a photo-current upon receipt of irradiation of light, a pair of signal electrodes, disposed at both ends of said detection surface, adapted for outputting on a share basis the photo-current generated by irradiation of light onto said detection surface, and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal, said semiconductor photo detector element being used on a common basis for said remote control device and said distance measuring equipment and serving to detect both light emitted from said remote control equipment and incident through said light detection window and light for focusing reflected on the subject and incident through said light detection window; and a control unit for generating a control signal to change over said first switch and transmitting the control signal to said semiconductor photo detector element.

According to the third camera of the present invention as mentioned above, there is adopted the semiconductor photo detector element having the above-mentioned first switch. This feature makes it possible for the semiconductor photo detector element to serve to detect both light emitted from the remote control equipment and light for focusing reflected on the subject. Thus, according to the third camera of the present invention, as compared with the conventional camera in which photo detector elements are provided individually for the remote control device and the distance measuring equipment, it is possible to reduce the number of photo detector elements.

To achieve the above-mentioned object, the present invention provides a fourth camera loaded with a remote control device responsive to light from a remote control equipment for controlling the camera in accordance with an emission of light directed to the camera for instructing an execution of operation according to detection of the light, a flash emission device in which at time of a photography a flash is projected to a subject, a reflected light from the subject is detected, and a flash emission is stopped at a timing that the reflected light reaches a predetermined light quantity, and a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said camera comprises:

a semiconductor photo detector element comprising a detection surface for generating a photo-current upon receipt of irradiation of light, a pair of signal electrodes, disposed at both ends of said detection surface, adapted for outputting on a share basis the photo-current generated by irradiation of light onto said detection surface, and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal, said semiconductor photo detector element being used on a common basis for said remote control device, said flash emission device and said distance measuring equipment and serving to detect three types of light emitted from said remote control equipment and incident through said light detection window, flash reflected on the subject and incident through said light detection window and light for focusing reflected on the subject and incident through said light detection window; and a control unit for generating a control signal to change over said first switch and transmitting the control signal to said semiconductor photo detector element.

According to the fourth camera of the present invention as mentioned above, there is adopted the semiconductor photo detector element having the above-mentioned first switch. This feature makes it possible for the semiconductor photo detector element to serve to detect three types of light emitted from the remote control equipment, flash reflected on the subject and light for focusing reflected on the subject. Thus, according to the fourth camera of the present invention, as compared with the conventional camera in which photo detector elements are provided individually for the remote control device, the flash emission device and the distance measuring equipment, it is possible to reduce the number of photo detector elements.

In any of the first to fourth cameras of the present invention as mentioned above, it is acceptable that said semiconductor photo detector element, when said first switch is in the first state, said pair of signal electrodes output on a share basis the photo-current generated by irradiation of light onto said detection surface in accordance with respective distances between an irradiation position of the light on said detection surface and both the ends of the detection of the detection surface.

In any of the first to fourth cameras of the present invention as mentioned above, it is acceptable that said semiconductor photo detector element further comprises a second switch, disposed at a boundary between divided two areas of said detection surface, each of said two areas including associated one edge of said detection surface, for selectively offering a first state which permits the photo-current generated on said detection surface to conduct through the boundary, and a second state which inhibits the photo-current generated on said detection surface from conducting through the boundary, in accordance with a control signal, and said control generates a control unit signal to change over said first switch and said second switch in such a manner that when one of said first switch and said second switch is in the first state, another switch is in the second state, and transmits the control signal to said semiconductor photo detector element.

DETAILED DESCRIPTION OF PREFERRED EMBODIMENTS

Embodiments of the present invention will be described with reference to the accompanying drawings.

Figure 1:
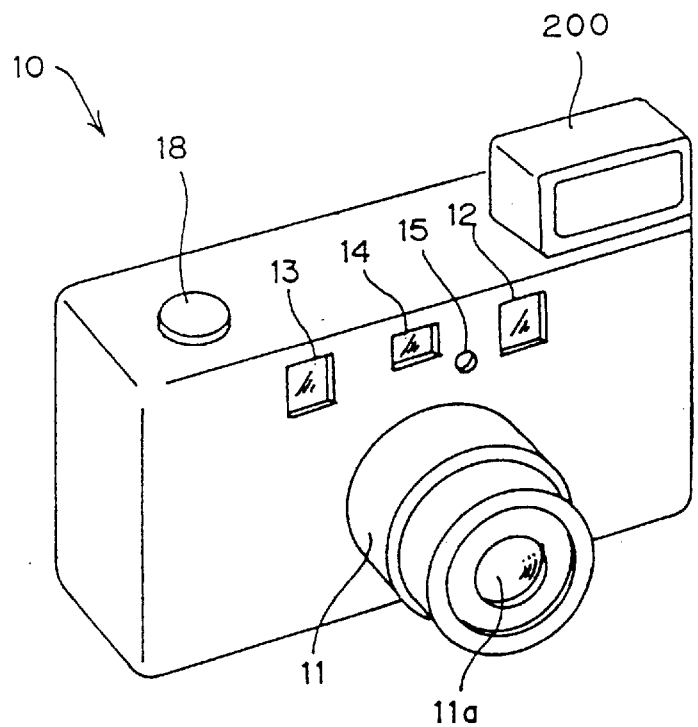
FIG. 1 is a perspective view of a camera according to an embodiment of the present invention, looking obliquely upward from the front.

FIG. 1 is a perspective view of a camera according to an embodiment of the present invention, looking obliquely upward from the front.

A camera 10 shown in FIG. 1 incorporates therein an automatic focusing (AF) device generally referred to as an active type, and is for performing a photography on a roll-like shaped photographic film. The AF device incorporated in the camera corresponds to an embodiment of distance measuring equipment of the present invention.

At the front central portion of the camera 10, there is provided a zoom barrel 11 in which an optical zoom lens lha is built. The camera 10 is provided with an automatic electronic flash device (corresponding to an embodiment of a flash emission device referred to in the present invention) and a remote control device as well as the automatic focusing device.

The automatic focusing device comprises a light projecting unit, having an AF light projection window 12 disposed at the front upper portion of the camera 10, for projecting light for focusing from the AF light projection window 12 in front of the camera 10, and a photo detector unit, having an AF light detection window 13 disposed at the front portion of the camera 10 and at an interval of a predetermined distance from the AF light projection window 12, for determining a distance up to a camera subject in such a manner that light is projected from the AF light projection window 12 in front of the camera 10, and light reflected on the camera subject is detected through the AF light detection window 13. The photo detector unit is provided with a PSD, which is a kind of semiconductor photo detector element referred to in the present invention, disposed behind the AF light detection window 13. The photo detector unit will be described in detail later.

On the top of the camera 10, there is provided a light emission unit 200 of the automatic electronic flash device. A photo detector element for detecting a reflected light of an electronic flash, of the automatic electronic flash device, is used on a common basis with the PSD of the photo detector unit of the automatic focusing device, disposed behind the AF light detection window 13. According to the automatic electronic flash device, at the time of a photography a flash is projected to a camera subject, a reflected light from the camera subject is detected, and a flash emission is stopped at a timing that the reflected light reaches a predetermined light quantity.

The remote control device instructs an execution of an operation according to a received light from a remote control equipment for controlling the camera 10 in accordance with an emission of light directed to the camera 10. Here, the PSD of the photo detector unit of the automatic focusing device serves also as the photo detector element of the remote control device.

The camera 10 is further provided with a zoom finder window 14 constituting a zoom finder unit (not illustrated) and an AE detection window 15 for leading light to an internal AE sensor for an exposure adjustment. Further, on the top of the camera 10, there is provided a shutter button 18.

Figure 2:
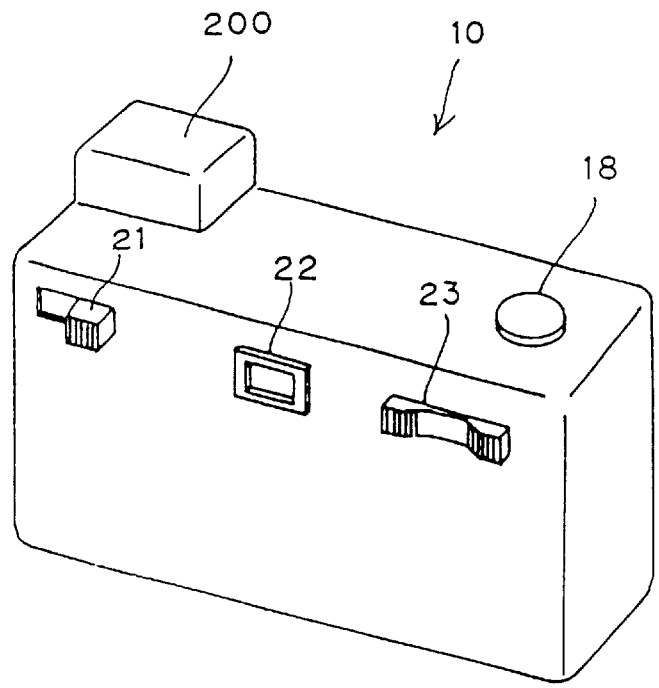
FIG. 2 is a perspective view of the camera shown in FIG. 1, looking obliquely upward from behind.

FIG. 2 is a perspective view of the camera shown in FIG. 1, looking obliquely upward from behind.

On the back of the camera 10, there is provided an electronic flash on/off switch 21 for selecting whether the automatic electronic flash device is to be operated at the time of photography, a finder eyepiece window 22 and a zoom operating lever 23 for operating the optical zoom lens 11a to a tele-slde (a long distance side) or a wide-side (a short distance side).

The camera 10 thus constructed is improved in accuracy of focusing, and is small in a circuit scale and reduced in cost. Hereinafter, details of the camera 10 will be described.

Figure 3:
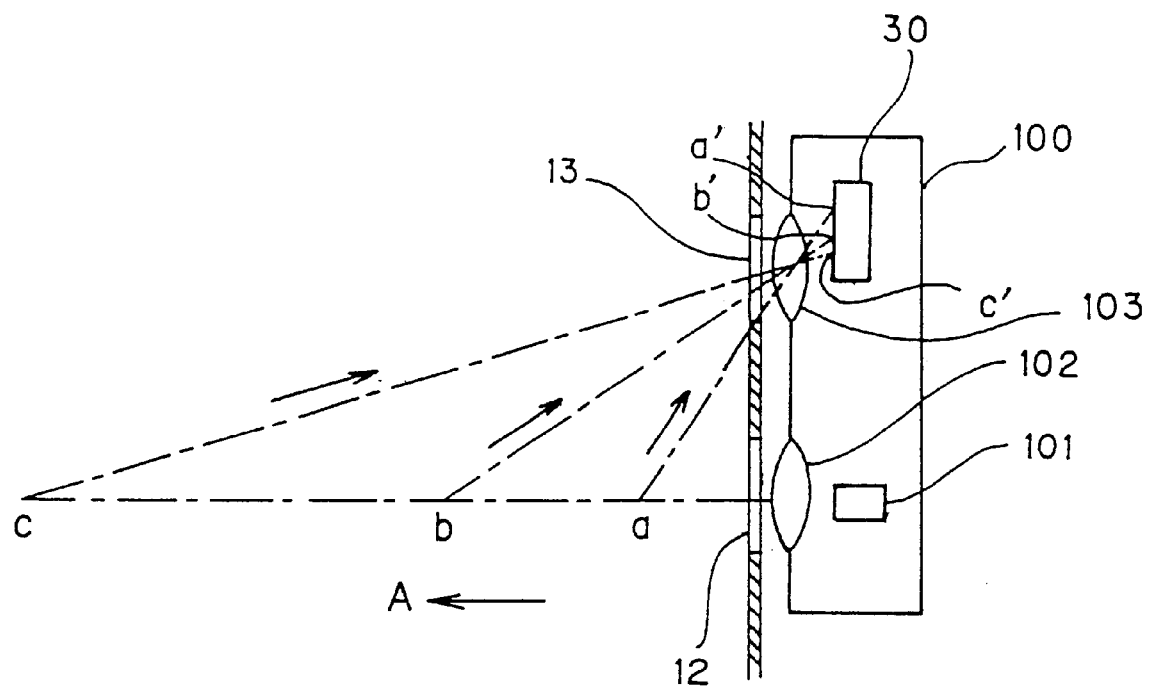
FIG. 3 is a typical illustration of an optical system of an automatic focusing device of the camera shown in FIG. 1.

FIG. 3 is a typical illustration of an optical system of an automatic focusing device of the camera shown in FIG. 1.

The camera 10 shown in FIG. 1 is provided with an AF unit 100. The AF unit 100 is provided with an LED 101, which is a light emitting diode for light projection disposed at the back of the AF light projection window 12 of the camera 10, and a projection lens 102 for narrowing a light beam emitted from the LED 101 down. At the back of the AF light detection window 13 of the camera 10, there is disposed a PSD 30, which is a kind of semiconductor photo detector element, and a photo detection lens 103 for condensing on the PSD 30 light emitted from the LED 101 and reflected on a camera subject (not illustrated).

Light for photometry emitted from the LED 101 travels via the projection lens 102 and the AF light projection window 12 forward (in an arrow A direction), and reflects on the camera subject (not illustrated). Incident light from the AF light detection window 13, of the reflected light, is condensed on the PSD 30 via the photo detection lens 103. Here, in the event that the camera subject is at a point a, light reflected on the point a is condensed on a point a' of the PSD 30. In the event that the camera subject is at a point b, light reflected on the point b is condensed on a point b' of the PSD 30, which is different from the point a'. In the event that the camera subject is at a point c' light reflected on the point c is condensed on a point c' of the PSD 30, which is different from the points a' and b'. In this manner, the condensing point on the PSD 30 is varied in accordance with a distance of the camera subject from the camera 10. Consequently, it is possible to determine a distance of the camera subject through detecting a position of the condensing point. The camera according to the present embodiment adopts a focusing according to this principle, when the camera subject is at the relatively short distance, as will be described later.

Further, while there exists an error due to a difference of a reflectance of the camera subject, when the camera subject is at the short distance, the strong light will be returned onto the PSD 30. On the other hand, when the camera subject is at the long distance, only the relatively weak light will be returned onto the PSD 30. Consequently, it is possible to determine a distance of the camera subject also through detecting on the PSD 30 the intensity (light quantity) of the light emitted from the LED 101 and reflected on the camera subject. The camera according to the present embodiment adopts a focusing according to this principle, when the camera subject is at the relatively long distance, as will be described later.

Figure 4:
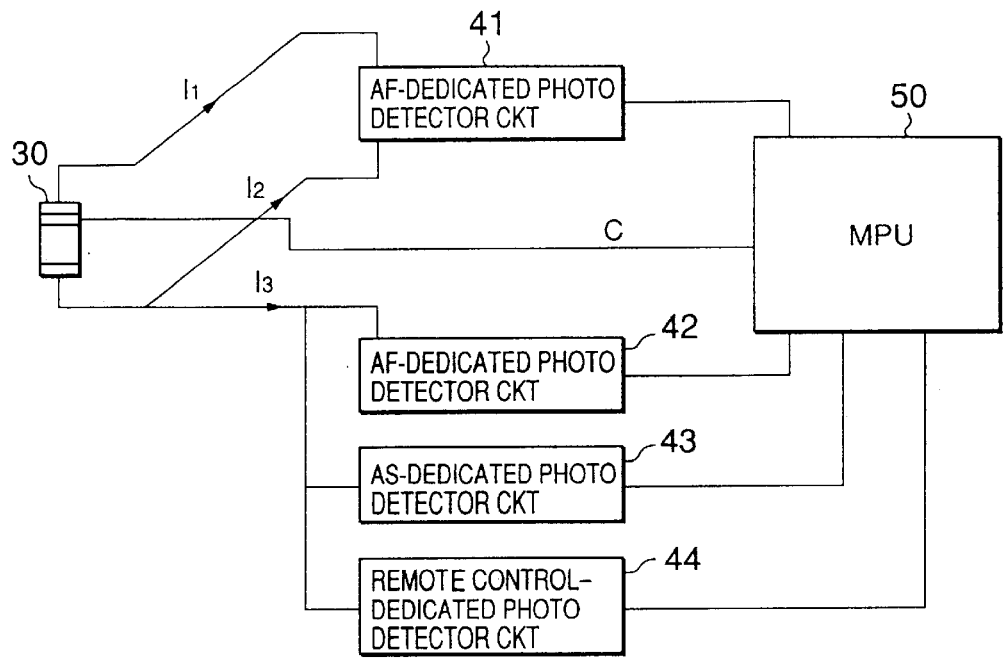
FIG. 4 is a circuit diagram of a photo detector unit of the camera shown in FIG. 1.
Figure 5:
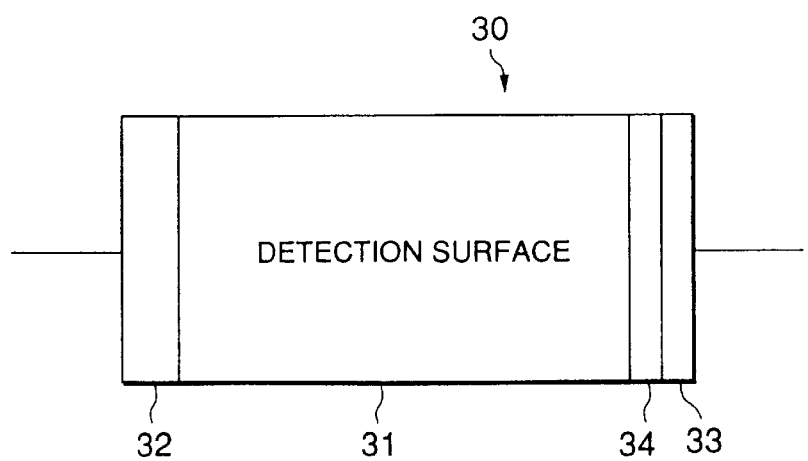
FIG. 5 is a typical illustration of a PSD element shown in FIG. 4.

FIG. 4 is a circuit diagram of a photo detector unit of the camera shown in FIG. 1. FIG. 5 is a typical illustration of the PSD shown in FIGS. 3 and 4.

A photo detector unit, as shown in FIG. 4, comprises the PSD 30, an AF-dedicated photo detector circuit 41 (corresponding to an example of a first distance operating unit referred to in the present invention), an AF-dedicated photo detector circuit 42 (corresponding to an example of a second distance operating unit referred to in the present invention), an AS (Auto Strobe)-dedicated photo detector circuit 43, a remote control-dedicated photo detector circuit 44, and an MPU 50. First, the PSD 30 will be explained referring to FIG. 5.

The PSD 30, as shown in FIG. 5, comprises a detection surface 31 for generating a photo-current upon receipt of irradiation of light, a pair of signal electrodes 32 and 33, provided at both ends of the detection surface 31, respectively, for outputting the photo-current generated by irradiation of light onto the detection surface 31 on a share basis in accordance with the respective distances between an irradiation position of the light on the detection surface 31 and both the ends of the detection surface 31, and a switch 34 (a first switch referred to in the present invention), disposed at a position adjacent to the signal electrode 33 which is one of the pair of signal electrodes 32 and 33, for selectively offering a low impedance state which permits the photo-current generated on the detection surface 31 to conduct into the signal electrode 33, and a high impedance state which inhibits the photo-current generated on the detection surface 31 from conducting into the signal electrode 33, in accordance with a control signal which will be described later.

Figure 6:
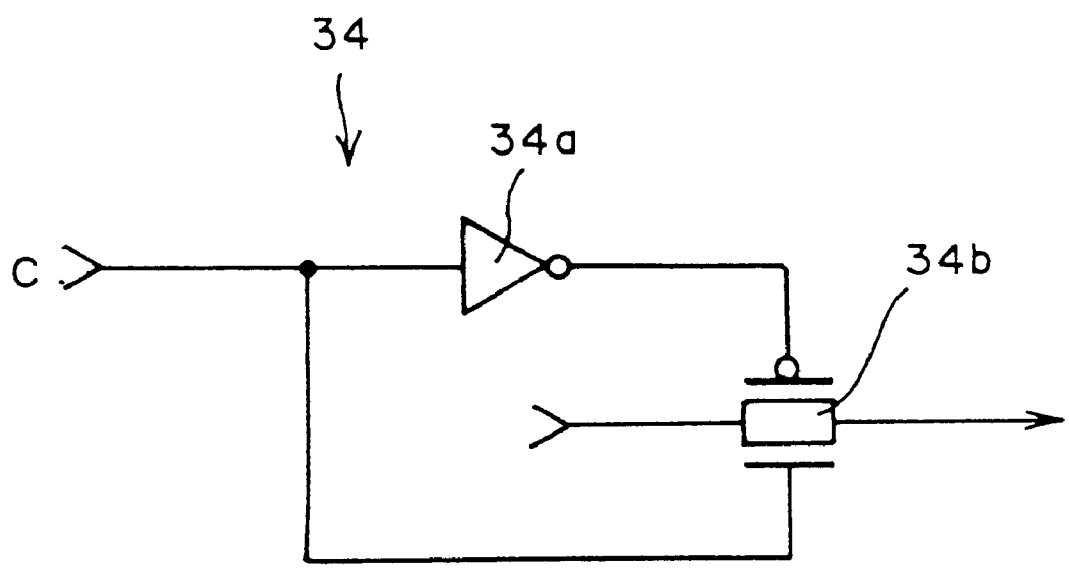
FIG. 6 is a circuit diagram of a switch constituting the PSD element shown in FIG. 5.

FIG. 6 is a circuit diagram of the switch constituting the PSD element shown in FIG. 5.

The switch 34 comprises a CMOS inverter 34*a* to which a control signal C is applied, and a CMOS transfer gate 34*b* connected to an input and an output of the CMOS inverter 34*a*. When a 'H' level of voltage is entered as the control signal C, the CMOS transfer gate 34*b* offers the low impedance state which permits the photo-current generated on the detection surface 31 to conduct into the signal electrode 33. On the other hand, when a 'L' level of voltage is entered as the control signal C, the CMOS transfer gate 34*b* offers the high impedance state which inhibits the photo-current generated on the detection surface 31 from conducting into the signal electrode 33.

Again referring to FIG. 4, the MPU 50 generates the control signal C for changing over the switch 34 and transmits the same to the PSD 30.

The AF-dedicated photo detector circuit 41 determines a distance up to a camera subject in accordance with two types of photo-current $I_1$ and $I_2$ obtained through the pair of signal electrodes 32 and 33, in a state that the 'H' level of control signal C for changing over the switch 34 to the low impedance state is transmitted to the PSD 30 by the MPU 50.

The AF-dedicated photo detector circuit 42 determines a distance up to a camera subject in accordance with photo-current $I_3$ obtained through the signal electrode 32, in a state that the 'L' level of control signal C for changing over the switch 34 to the high impedance state is transmitted to the PSD 30 by the MPU 50.

The AS-dedicated photo detector circuit 43 integrates the photo-currents from the signal electrode 32, which are obtained in such a manner that a flash is emitted from the light emission unit 200 of the automatic electronic flash device and a reflected light from the camera subject is detected by the PSD 30, and outputs a signal to stop a flash emission at a timing that the reflected light reaches a predetermined quantity of reflected light, in a state that the 'L' level of control signal C for changing over the switch 34 to the high impedance state is transmitted to the PSD 30 by the MPU 50. This signal is transmitted to a flash emission stop control unit (not illustrated) and the MPU 50 as well. Upon receipt of this signal, the flash emission stop control unit executes a stop processing for the flash emission. On the other hand, upon receipt of this signal, the MPU 50 performs a control such as a shutter close.

The remote control-dedicated photo detector circuit 44 generates and outputs to the MPU 50 a signal indicative of the fact that light from a remote control equipment is detected in accordance with the photo-current from the signal electrodes 32 obtained through detection of light from the remote control equipment by the PSD 30, in a state that the 'L' level of control signal C for changing over the switch 34 to the high impedance state is transmitted to the PSD 30 by the MPU 50. Upon receipt of this signal, the MPU 50 starts an execution of a series of sequence for photography consisting of a measurement of distance up to a camera subject, a measurement of brightness on a field, a shutter switching, a film winding up and so on.

According to the camera 10 of the present embodiment, as mentioned above, in the event that a photography is performed at the relatively short distance, the switch 34 is switched by the MPU 50 to offer the low impedance state. Thus, the AF-dedicated photo detector circuit 41 determines a distance up to a camera subject in accordance with both the photo-currents I, and I2 obtained through the pair of signal electrodes 32 and 33 of the PSD 30. On the other hand, in the event that the AF-dedicated photo detector circuit 41 determines a distance up to the camera subject in a manner as mentioned above, and as a result when the distance thus determined is the relatively long distance, the MPU 50 switches the switch 34 to offer the high impedance state in accordance with distance data representative of the determined distance, so that the AF-dedicated photo detector circuit 42 determines a distance up to the camera subject in accordance with photo-current $I_3$ obtained from the signal electrode 32 of the PSD 30. In this manner, in the event that a photography is performed at the relatively long distance, there is performed a processing of determining a distance up to the subject in accordance with a total quantity of light.

Hereinafter, there will be explained a focusing algorithm in the camera 10.

As a data arithmetic procedure for an active type of automatic focusing (AF) device, a ratio arithmetic procedure is well known.

In the event that the AF device is constructed with a low cost, an arithmetic output result of the AF block is fixed on the ratio arithmetic procedure. Thus, it is difficult to obtain the data arithmetic output according to the state of the subject.

For this reason, according to a camera of the present embodiment, in order that the conventional AF data arithmetic procedure is used to output an arithmetic result other than ratio arithmetic data, so that a long distance performance is improved, the camera 10 performs the following operation.

In the ratio arithmetic procedure, the following expression is given.

$$R=N/(N+F) \text{ or } R=F/(N+F) \quad (1)$$

Where R denotes output data, N: a short distance side signal, and F: a long distance side signal.

With respect to this R, a relation of $R=\alpha \times (1L)$ applies for the subject distance L, where $\alpha$ is determined in accordance with the AF system. In the camera 10, the ratio arithmetic procedure is adopted for the short distance photography, and the AF-dedicated photo detector circuit 41 performs the arithmetic processing in accordance with the ratio arithmetic procedure.

On the other hand, in the event that the long distance side signal F is fixed on the signal C, and the short distance side signal is replaced by P=(N+F) which denotes a total value of N and F in case of the ratio operation, from the formula (1), $$R'=P/(P+C) \text{ or } R'=C/(P+C) \quad (2)$$

is outputted in form of the arithmetic result.

Here, in the event that a total value (N+F) of N and F in case of a specific distance $L_0$ is given by $P_0$, and R' determined in accordance with equation (2) is given by $R_0$, the following expression is given.

$$P_0=R_0 \times C/(1-R_0) \text{ or } P_0=(1-R_0) \times C/R_0 \quad (3)$$

With respect to an arbitrary distance L and the associated total value P, $$P=P_0 \times (L_0/L)^2 \quad (4)$$

is established.

From equations (2) and (4), the distance L is expressed through P by R' as follows:

$$L=\sqrt{\{(1-R') \times P_0/(R' \times C)\}} \times L_0$$

Or $$L=\sqrt{\{R' \times P_0/((1-R') \times C)\}} \times L_0 \quad (5)$$

With respect to the distance L, a derivation method, which is the same as the ratio arithmetic processing, is used to derive focusing data from light quantity P. According to the camera 10 of the present embodiment, in the event that a photography is performed at a relatively long distance, the AF-dedicated photo detector circuit 42 performs a distance arithmetic processing based on the light quantity as mentioned above, so that a distance up to the subject is determined. Thus, according to the camera of the present embodiment, it is possible to improve the accuracy of the focusing as compared with the conventional camera in which the accuracy of the focusing is lowered owing to the fact that noise of a PSD element is increased in the long distance photography.

While FIG. 4 shows two individual AF-dedicated photo detector circuits 41 and 42 with individual blocks, it is not always required that two AF-dedicated photo detector circuits 41 and 42 are provided individually. It is acceptable that a single AF-dedicated photo-detector circuit, which serves as both a first distance arithmetic unit and a second distance arithmetic unit, referred to in the present invention, is provided.

Next, there will be explained a series of sequence operations of the camera 10 with reference to FIG. 1 and 4. Here, for the purpose of explanation of the whole, there will be explained a photography using all three of the devices including the automatic focusing device, an automatic electronic flash device and the remote control device.

At the initial state, the MPU 50 outputs an 'L' level of signal as the control signal C, so that the switch 34 offers the high impedance state. Consequently, the PSD 30 is in a light quantity mode in which an amount of light is simply detected. In this condition, light indicative of an instruction of execution of a self-timer operation is applied to the AF light detection window 13 from an external remote control equipment. This light is detected by the PSD 30 and fed through the remote control-dedicated photo detector circuit 44 to the MPU 50. Upon receive of a signal related to the detected light, the MPU 50 starts execution of a series of sequences for photography and changes the control signal C from the 'L' level to the 'H' level. Then, the switch 34 offers the low impedance state, so that the PSD 30 is in a mode in which the PSD 30 serves as the original PSD. Next, when the process goes to a step for performing focusing of a series of sequences for photography, the AF-dedicated photo detector circuit 41 performs focusing in such a manner that light is projected from the light projection unit through the AF light projection window 12 in front of the camera 10, and light reflected on the camera subject is detected through the AF light detection window 13 by the PSD 30. Data obtained through the focusing is fed to the MPU 50.

When the MPU 50 decides that the entered data is data indicative of the relatively short distance, the MPU 50 performs a control of lens driving for focusing in accordance with the data thus decided.

On the other hand, when the MPU 50 decides that the entered data is data indicative of the relatively long distance, the MPU 50 changes the control signal C from the 'H' level to the 'L' level, so that the switch 34 offers the high impedance state, and as a result the PSD 30 is set to the light quantity mode. Next, the AF-dedicated photo detector circuit 42 performs focusing in such a manner that light is projected from the light projection unit through the AF light projection window 12 in front of the camera 10, and light reflected on the camera subject is detected through the AF light detection window 13 by the PSD 30. Data obtained through the focusing is fed to the MPU 50. The MPU 50 performs a control of lens driving for focusing in accordance with the data thus obtained through the focusing.

Next, in the event that the switch 34 does not yet offer the high impedance state, the MPU 50 causes the switch 35 to offer the high impedance state so that the PSD 30 is set to the light quantity mode. After a predetermined time by a self-timer elapses, the MPU 50 causes the shutter operation to be executed, so that a flash is emitted from the light emission unit 200 to a camera subject. Light reflected from the camera subject is detected by the PSD 30 and converted into a photo-current, and the photo-current is fed to the AS-dedicated photo detector circuit 43. The AS-dedicated photo detector circuit 43 integrates the photo-current and outputs a signal to stop the flash emission at the timing when an integrated values of the photo-current reaches a predetermined amount of reflected light. This signal is transmitted to a flash emission stop control unit (not illustrated) to perform a processing of stopping a flash emission, and is transmitted also to the MPU 50. The MPU 50 performs a control of the shutter close and the like in response to this signal. Through a series of sequences as mentioned above, a self-timer operation is performed in accordance with an instruction from an external remote control equipment, so that a photography by the electronic flash is performed.

As mentioned above, according to the camera 10 of the present embodiment, in the event that a photography is performed at a relatively long distance, the MPU 50 switches the switch 34 of the PSD 30 to offer the high impedance state, so that the AF-dedicated photo detector circuit 42 determines a distance up to the camera subject in accordance with an amount of reflected light. Thus, it is possible to improve an accuracy of focusing in connection with focusing of long distance. Further, according to the camera 10, the single PSD 30 is used to detect three types of light, that is, light emitted from the remote control equipment, light for focusing reflected on the subject, and flash reflected on the subject. Therefore, according to the camera 10 of the present embodiment, as compared with the conventional camera provided with a photo detector on each device, the number of photo detectors can be reduced, and it is possible to reduce the cost.

Next, there will be explained a camera according to an alternative embodiment of the present invention.

The camera, which will be explained hereinafter, is identical to that shown in FIGS. 1 to 3 in connection with the appearance and the structure of the AF unit. Accordingly, here, there will be described a circuit for a photo detector unit and a semiconductor photo detector element, which correspond to those shown in FIGS. 4 and 5, respectively.

Figure 7:
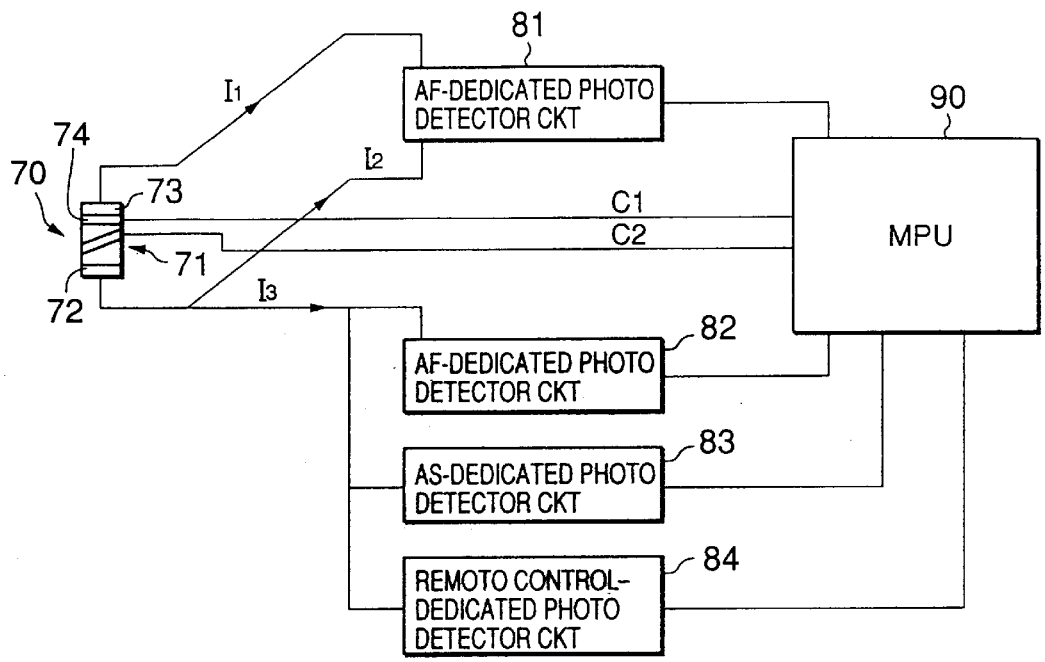
FIG. 7 is a circuit diagram of a photo detector unit of the camera according to an alternative embodiment of the present invention.
Figure 8:
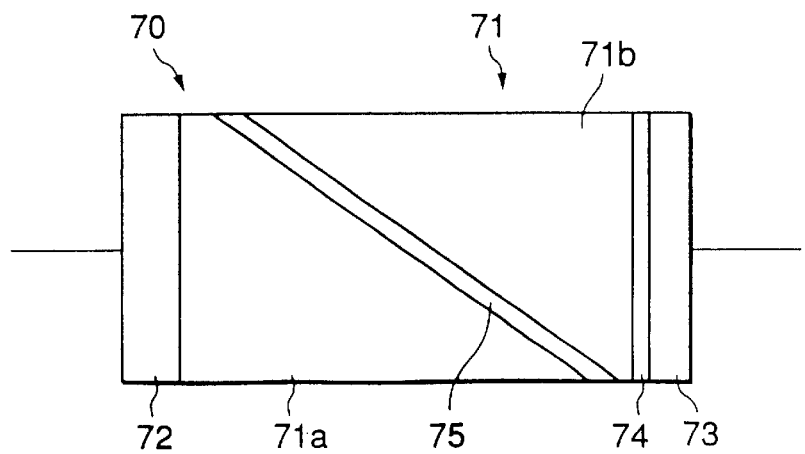
FIG. 8 is a typical illustration of an SPD element shown in FIG. 7.
Figure 9:
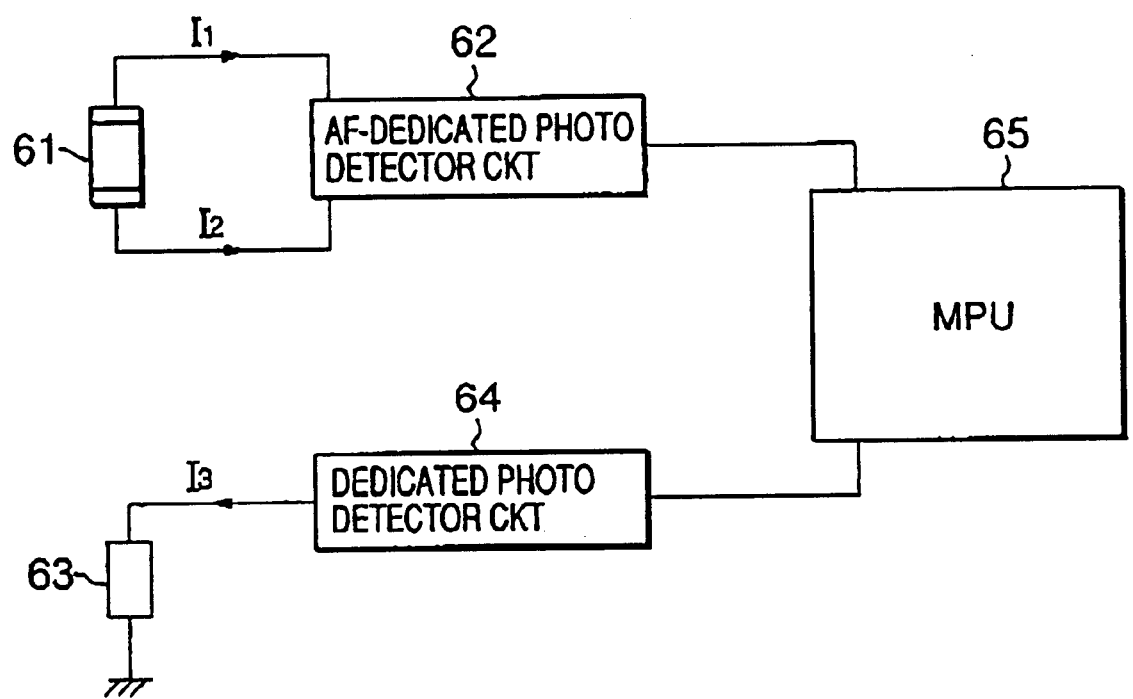
FIG. 9 is a diagram of semiconductor photo detector elements incorporated into the respective devices and their associated circuits, with respect to the conventional camera.

FIG. 7 is a circuit diagram of a photo detector unit of the camera according to an alternative embodiment of the present invention. FIG. 8 is a typical illustration of an SPD element shown in FIG. 7.

The photo detector unit of the camera shown in FIG. 7 comprises an SPD 70, an AF-dedicated photo detector circuit 81 (corresponding to an example of a first distance operating unit referred to in the present invention), an AF-dedicated photo detector circuit 82 (corresponding to an example of a second distance operating unit referred to in the present invention), an AS (Auto Strobe)-dedicated photo detector circuit 83, a remote control-dedicated photo detector circuit 84, and an MPU 90. First, the SPD 70 will be explained referring-to FIG. 8.

The SPD 70, as shown in FIG. 8, comprises a detection surface 71 for generating a photo-current upon receipt of irradiation of light. The detection surface 71 is divided into two divided areas 71a and 71b. Signal electrodes 72 and 73 are provided at both ends of the detection surface 71 in association with the divided areas 71a and 71b, respectively. The signal electrodes 72 and 73 are connected to the divided areas 71a and 71b, respectively, and output the photo-current generated by irradiation of light onto the detection surface 71.

The SPD 70 is provided with a first switch 74, disposed at a position associated with the signal electrode 73 (corresponding to an example of another signal electrode referred to in the present invention) excepting one signal electrode 72 (corresponding to an example of one signal electrode referred to in the present invention) of the signal electrodes 72 and 73, for selectively offering a low impedance state which permits the photo-current generated on the detection surface 71 to conduct into the signal electrode 73, and a high impedance state which inhibits the photo-current generated on the detection surface 71 from conducting into the signal electrode 73, in accordance with a control signal which will be described later.

The SPD 70 is provided with a second switch 75, disposed at a boundary between the divided areas 71a and 71b, for selectively offering a low impedance state which permits the photo-current generated on the detection surface 71 to conduct through the boundary, and a high impedance state which inhibits the photo-current generated on the detection surface 71 from conducting through the boundary, in accordance with a control signal which will be described later.

Both the first switch 74 and the second switch 75 have the same structure as FIG. 6.

The MPU 90 shown in FIG. 7 generates and transmits to the SPD 70 control signals C1 and C2 to change over the states of the first switch 74 and the second switch 75 in such a manner that when one of the first switch 74 and the second switch 75 offers the low impedance state, another switch offers the high impedance state.

The AF-dedicated photo detector circuit 81 determines a distance up to a camera subject in accordance with two types of photo-current $I_1$ and $I_2$ obtained through the signal electrodes 72 and 73, in a state that the control signals C1 and C2 for changing over the first switch 74 to the low impedance state and the second switch 75 to the high impedance state are transmitted to the SPD 70 by the MPU 90.

The AF-dedicated photo detector circuit 82 determines a distance up to a camera subject in accordance with photo-current $I_3$ obtained through the signal electrode 72, in a state that the control signals C1 and C2 for changing over the first switch 74 to the high impedance state and the second switch 75 to the low impedance state are transmitted to the SPD 70 by the MPU 90.

The distance arithmetic algorithm in the AF-dedicated photo detector circuits 81 and 82 is the same as the AF-dedicated photo detector circuits 41 and 42 shown in FIG. 4. And thus the redundant description will be omitted.

The AS-dedicated photo detector circuit 83 integrates the photo-currents from the signal electrode 72, which are obtained in such a manner that a flash is emitted from the light emission unit 200 of the automatic electronic flash device and a reflected light from the camera subject is detected by the SPD 70, and outputs a signal to stop a flash emission at a timing that the reflected light reaches a predetermined quantity of reflected light, in a state that the control signals C1 and C2 for changing over the first switch 74 to the high impedance state and the second switch 75 to the low impedance state are transmitted to the SPD 70 by the MPU 90. This signal is transmitted to a flash emission stop control unit (not illustrated) and the MPU 90 as well. Upon receipt of this signal, the MPU 90 performs a control such as a shutter close.

The remote control-dedicated photo detector circuit 84 generates and outputs to the MPU 90 a signal indicative of the fact that light from a remote control equipment is detected in accordance with the photo-current from the signal electrodes 72 obtained through detection of light from the remote control equipment by the SPD 70, in a state that the control signals C1 and C2 for changing over the first switch 74 to the high impedance state and the second switch 75 to the low impedance state are transmitted to the SPD by the MPU 90. Upon receipt of this signal, the MPU 70 starts an execution of a series of sequences for photography consisting of a measurement of distance up to a camera subject, a measurement of brightness on a field, a shutter switching, a film winding up and so on.

According to the camera having the photo detector unit shown in FIG. 7, the single SPD 70 is used to detect three types of light, that is, light emitted from the remote control equipment, light for focusing reflected on the subject, and flash reflected on the subject. Therefore, according to the camera of the present embodiment, in a similar fashion to that of the embodiment having the PSD element as mentioned above, as compared with the conventional camera provided with a photo detector on each device, the number of photo detectors can be reduced, and it is possible to reduce the cost.

Incidentally, according to the cameras of the above-mentioned embodiments of the present invention, the cameras are explained having a combination of three devices, including the automatic focusing device, the automatic electronic flash device and the remote control device. However, the camera of the present invention is not restricted to this combination. It is acceptable to adopt a combination of two devices, such as the automatic focusing device and the automatic electronic flash device each having the AF-dedicated photo detector circuit and the AS-dedicated photo detector circuit, or an alternatively a combination of the automatic focusing device and the remote control device each having the AF-dedicated photo detector circuit and the remote control-dedicated photo detector circuit. Alternatively, regardless of the combination of the automatic focusing device with an automatic electronic flash device or the remote control device, in order to enhance an accuracy of the focusing, it is acceptable to provide a camera having an automatic focusing device provided with two AF-dedicated photo detector circuits which are mutually different in a focusing system.

Further, the present invention is not confined to the usual type of camera performing a photography on a roll-like shape of photographic film, but applicable to any type of camera such as an instant camera in which a film is taken out of the camera while being developed, and an electronic still camera in which an image of a subject is formed on a CCD photo detector array and the image is derived in a form of a signal.

As mentioned above, according to the present invention, it is possible to implement a camera improving the accuracy of focusing and reducing the cost with a small scale of circuit.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A semiconductor photo detector element comprising:
   a detection surface for generating a photo-current upon receipt of irradiation of light;
   a pair of signal electrodes, disposed at both ends of said detection surface, adapted for outputting on a share basis the photo-current generated by irradiation of light onto said detection surface; and
   a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal.

2. A semiconductor photo detector element according to claim 1, wherein when said first switch is in the first state, said pair of signal electrodes output on a share basis the photo-current generated by irradiation of light onto said detection surface in accordance with respective distances between an irradiation position of the light on said detection surface and both the ends of the detection surface.

3. A semiconductor photo detector element according to claim 1, wherein said semiconductor photo detector element further comprises a second switch, disposed at a boundary located between two divided areas of said detection surface, each of said two areas including associated one edge of said detection surface, for selectively offering a first state which permits the photo-current generated on said detection surface to conduct through the boundary, and a second state which inhibits the photo-current generated on said detection surface from conducting through the boundary, in accordance with a control signal.

4. A semiconductor photo detector element according to claim 1, wherein said first state is a low impedance state, and said second state is a high impedance state.

5. A distance measuring equipment comprising:
   a light projecting unit for projecting light for a distance measurement; and
   a photo detector unit, having a light detection window disposed at an interval of a predetermined distance from said light projecting unit, for determining a distance up to a subject in such a manner that light is projected from said light projecting unit, and light reflected on the subject is detected through said light detection window,
   wherein said photo detector unit comprises:
   a semiconductor photo detector element comprising a detection surface for generating a photo-current upon receipt of irradiation of light, a pair of signal electrodes, disposed at both ends of said detection surface, adapted for outputting on a share basis the photo-current generated by irradiation of light onto said detection surface, and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal;
   a first distance arithmetic unit for determining a distance up to the subject in accordance with both the photo-currents derived through said pair of signal electrodes, in a state that said first switch is changed over to said first state; and
   a second distance arithmetic unit for determining a distance up to the subject in accordance with the photo-current derived through another signal electrode different from said one signal electrode, of said pair of signal electrodes, in a state that said first switch is changed over to said second state.

6. A distance measuring equipment according to claim 5, wherein in said semiconductor photo detector element, when said first switch is in the first state, said pair of signal electrodes output on a share basis the photo-current generated by irradiation of light onto said detection surface in accordance with respective distances between an irradiation position of the light on said detection surface and both the ends of the detection surface.

7. A distance measuring equipment according to claim 5, wherein said semiconductor photo detector element further comprises a second switch, disposed at a boundary located between two divided areas of said detection surface, each of said two areas including associated one edge of said detection surface, for selectively offering a first state which permits the photo-current generated on said detection surface to conduct through the boundary, and a second state which inhibits the photo-current generated on said detection surface from conducting through the boundary, in accordance with a control signal.

8. A camera loaded with a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said photo detector unit comprises:

a semiconductor photo detector element comprising a detection surface for generating a photo-current upon receipt of irradiation of light, a pair of signal electrodes, disposed at both ends of said detection surface, adapted for outputting on a share basis the photo-current generated by irradiation of light onto said detection surface, and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal;

a control unit for generating a control signal to change over said first switch and transmitting the control signal to said semiconductor photo detector element;

a first distance arithmetic unit for determining a distance up to the subject in accordance with both the photo-currents derived through said pair of signal electrodes, in a state that a control signal to change over said first switch to said first state is transmitted to said semiconductor photo detector element by said control unit; and a second distance arithmetic unit for determining a distance up to the subject in accordance with the photo-current derived through another signal electrode different from said one signal electrode, of said pair of signal electrodes, in a state that a control signal to change over said first switch to said second state is transmitted to said semiconductor photo detector element by said control unit.

9. A camera according to claim 8, wherein in said semiconductor photo detector element, when said first switch is in the first state, said pair of signal electrodes output on a share basis the photo-current generated by irradiation of light onto said detection surface in accordance with respective distances between an irradiation position of the light on said detection surface and both the ends of the detection surface.

10. A camera according to claim 8, wherein said semiconductor photo detector element further comprises a second switch, disposed at a boundary located between two divided areas of said detection surface, each of said two areas including associated one edge of said detection surface, for selectively offering a first state which permits the photo-current generated on said detection surface to conduct through the boundary, and a second state which inhibits the photo-current generated on said detection surface from conducting through the boundary, in accordance with a control signal, and said control generates a control unit signal to change over said first switch said second switch in such a manner that when one of said first switch and said second switch is in the first state, another switch is in the second state, and transmits the control signal to said semiconductor photo detector element.

11. A camera loaded with a flash emission device in which at time of a photography a flash is projected to a subject, a reflected light from the subject is detected, and a flash emission is stopped at a timing that the reflected light reaches a predetermined light quantity, and a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said camera comprises:

a semiconductor photo detector element comprising a detection surface for generating a photo-current upon receipt of irradiation of light, a pair of signal electrodes, disposed at both ends of said detection surface, adapted for outputting on a share basis the photo-current generated by irradiation of light onto said detection surface, and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal, said semiconductor photo detector element being used on a common basis for said flash emission device and said distance measuring equipment and serving to detect both flash reflected on the subject and incident through said light detection window and light for focusing reflected on the subject and incident through said light detection window; and a control unit for generating a control signal to change over said first switch and transmitting the control signal to said semiconductor photo detector element.

12. A camera according to claim 11, wherein in said semiconductor photo detector element, when said first switch is in the first state, said pair of signal electrodes output on a share basis the photo-current generated by irradiation of light onto said detection surface in accordance with respective distances between an irradiation position of the light on said detection surface and both the ends of the detection surface.

13. A camera according to claim 11, wherein said semiconductor photo detector element further comprises a second switch, disposed at a boundary located between two divided areas of said detection surface, each of said two areas including associated one edge of said detection surface, for selectively offering a first state which permits the photo-current generated on said detection surface to conduct through the boundary, and a second state which inhibits the photo-current generated on said detection surface from conducting through the boundary, in accordance with a control signal, and said control generates a control unit signal to change over said first switch and said second switch in such a manner that when one of said first switch and said second switch is in the first state, another switch is in the second state, and transmits the control signal to said semiconductor photo detector element.

14. A camera loaded with a remote control device responsive to light from a remote control equipment for controlling the camera in accordance with an emission of light directed to the camera for instructing an execution of operation according to detection of the light, and a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said camera comprises:

a semiconductor photo detector element comprising a detection surface for generating a photo-current upon receipt of irradiation of light, a pair of signal electrodes, disposed at both ends of said detection surface, adapted for outputting on a share basis the photo-current generated by irradiation of light onto said detection surface, and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal, said semiconductor photo detector element being used on a common basis for said remote control device and said distance measuring equipment and serving to detect both light emitted from said remote control equipment and incident through said light detection window and light for focusing reflected on the subject and incident through said light detection window; and a control unit for generating a control signal to change over said first switch and transmitting the control signal to said semiconductor photo detector element.

15. A camera according to claim 14, wherein in said semiconductor photo detector element, when said first switch is in the first-state, said pair of signal electrodes output on a share basis the photo-current generated by irradiation of light onto said detection surface in accordance with respective distances between an irradiation position of the light on said detection surface and both the ends of the detection surface.

16. A camera according to claim 14, wherein said semiconductor photo element further comprises a second switch, disposed at a boundary located between two divided areas of said detection surface, each of said two areas including associated one edge of said detection surface, for selectively offering a first state which permits the photo-current generated on said detection surface to conduct through the boundary, and a second state which inhibits the photo-current generated on said detection surface from conducting through the boundary, in accordance with a control signal, and said control generates a control unit signal to change over said first switch and said second switch in such a manner that when one of said first switch and said second switch is in the first state, another switch is in the second state, and transmits the control signal to said semiconductor photo detector element.

17. A camera loaded with a remote control device responsive to light from a remote control equipment for controlling the camera in accordance with an emission of light directed to the camera for instructing an execution of operation according to detection of the light, a flash emission device in which at time of a photography a flash is projected to a subject, a reflected light from the subject is detected, and a flash emission is stopped at a timing that the reflected light reaches a predetermined light quantity, and a distance measuring equipment comprising a light projecting unit, having a light projection window disposed in front of the camera, for projecting light for focusing from said light projection window in front of the camera, and a photo detector unit, having a light detection window disposed in front of the camera and at an interval of a predetermined distance from said light projection window, for determining a distance up to a subject in such a manner that light is projected from said light projection window in front of the camera, and light reflected on the subject is detected through said light detection window, wherein said camera comprises:

a semiconductor photo detector element comprising a detection surface for generating a photo-current upon receipt of irradiation of light, a pair of signal electrodes, disposed at both ends of said detection surface, adapted for outputting on a share basis the photo-current generated by irradiation of light onto said detection surface, and a first switch, disposed at a position adjacent to one signal electrode which is one of said pair of signal electrodes, for selectively offering a first state which permits the photo-current generated on said detection surface to conduct into said one signal electrode, and a second state which inhibits the photo-current generated on said detection surface from conducting into said one signal electrode, in accordance with a control signal, said semiconductor photo detector element being used on a common basis for said remote control device, said flash emission device and said distance measuring equipment and serving to detect three types of light emitted from said remote control equipment and incident through said light detection window, flash reflected on the subject and incident through said light detection window and light for focusing reflected on the subject and incident through said light detection window; and a control unit for generating a control signal to change over said first switch and transmitting the control signal to said semiconductor photo detector element.

18. A camera according to claim 17, wherein in said semiconductor photo detector element, when said first switch is in the first state, said pair of signal electrodes output on a share basis the photo-current generated by irradiation of light onto said detection surface in accordance with respective distances between an irradiation position of the light on said detection surface and both the ends of the detection surface.

19. A camera according to claim 17, wherein said semiconductor photo detector element further comprises a second switch, disposed at a boundary located between two divided areas of said detection surface, each of said two areas including associated one edge of said detection surface for selectively offering a first state which permits the photo-current generated on said detection surface to conduct through the boundary, and a second state which inhibits the photo-current generated on said detection surface from conducting through the boundary, in accordance with a control signal, and said control generates a control unit signal to change over said first switch and said second switch in such a manner that when one of said first switch and said second switch is in the first state, another switch is in the second state, and transmits the control signal to said semiconductor photo detector element.

* * * * *